UNITED STATES PATENT OFFICE 2,361,019

RESINOUS COMPOSITION AND THE METHOD OF PREPARING THE SAME

Howard L. Gerhart, Milwaukee, Wis., assignor to Pittsburgh Plate Glass Company, Allegheny County, Pa., a corporation of Pennsylvania No Drawing. Application August 15, 1941, Serial No. 407,003

8 Claims. (Cl. 260—42)

The present invention relates to the manufacture of artificial resins by interlinkage of organic compounds of comparatively simple molecular structure to form relatively large and complex molecules that provide a hard, tough body, which is resistant to chemical action and to most solvents.

The invention has particular relation to the preparation of resins by the conjoint polymerization of $\alpha\beta$ unsaturated dicarboxylic acids or anhydrides thereof and compounds containing reactive olefinic groups.

One object of the invention is to provide a resin of the foregoing type, which can be prepared easily and quickly at low temperatures from its primary ingredients.

This and other objects of the invention will be apparent from consideration of the following specification and the appended claims.

It has heretofore been proposed to prepare resins by the conjoint polymerization of esters of di or polyhydric alcohols and $\alpha\beta$ unsaturated dicarboxylic acids and polymerizable olefinic compounds. By application of such process it is possible to obtain resinous products which are hard, tough and clear. However, the reaction as heretofore employed has been unsatisfactory because of the necessity of employing relatively high temperatures, or large amounts of catalysts, in order to obtain a reasonable speed of polymerization. Under such conditions the reactions involved in polymerization were difficult to control.

The present invention is based upon the discovery that resinous products of superior quality can be easily and quickly obtained, even at relatively low temperatures, if the reaction mixture of unsaturated dicarboxylic acid ester and olefin includes as one of its components an anhydride of an $\alpha\beta$ unsaturated dicarboxylic acid or the free acid from which it is derived. For example, excellent results may be obtained by conjointly polymerizing an ester, such as diethylene glycol fumarate or maleate with styrene or an equivalent olefinic compound in the presence of maleic anhydride.

In the practice of the invention a monomeric or polymeric ester of fumaric or maleic acid and a di, tri or polyhydric alcohol is merely admixed with styrene or its equivalent and maleic anhydride and then subjected to polymerization, either in the presence or absence of a suitable catalyst, such as benzoyl peroxide. The temperature of polymerization may vary from normal atmospheric up to 100° C. or even higher. Satisfactory results may be obtained, for example by effecting the reaction at a temperature of 50° C. or thereabouts.

A specific example of a reaction mixture suitable for use in the practice of the invention would be as follows:

*Example I*

| | Grams |
|---|---|
| Diethylene glycol fumarate | 35 |
| Maleic anhydride | 20 |
| Styrene | 24 |

This mixture when heated to 50° C. in the absence of catalyst, polymerized to form a clear, hard, tough resin within a period of 2 hours. A similar mixture including $\frac{1}{10}$ of 1% of benzoyl peroxide under similar temperature conditions polymerized to the same physical state within a period of 15 minutes. In the absence of maleic anhydride, but in the presence of 0.1% benzoyl peroxide the reaction required 24 hours at 50° C.

Other mixtures which could be similarly polymerized were prepared as follows:

*Example II*

| | Grams |
|---|---|
| Diethylene glycol fumarate | 35 |
| Styrene | 31 |
| Maleic anhydride | 25 |

*Example III*

| | Grams |
|---|---|
| Maleic anhydride | 10 |
| Styrene | 12 |
| Diethylene glycol fumarate | 35 |

*Example IV*

| | Grams |
|---|---|
| Maleic anhydride | 25 |
| Styrene | 31 |
| Diethylene glycol fumarate | 15 |
| Dimethyl phthalate | 20 |

In the foregoing examples styrene was employed as the active olefinic compound. It will be appreciated that it may be replaced by other olefinic substances containing a reactive unsaturated group. Among such substances may be included indene, coumarone, alpha methyl or paramethyl styrene and others. The following constitute examples of compositions including as components such reactive olefinic compounds:

*Example V*

| | Grams |
|---|---|
| Indene | 18 |
| Maleic anhydride | 15 |
| Diethylene glycol fumarate | 35 |
| Benzoyl peroxide | 0.5 |

Example VI

| | Grams |
|---|---|
| Methyl styrene | 18 |
| Maleic anhydride | 15 |
| Diethylene glycol fumarate | 35 |
| Benzoyl peroxide | 0.5 |

Example VII

| | Grams |
|---|---|
| Methyl-p-methyl styrene | 18 |
| Maleic anhydride | 15 |
| Diethylene glycol fumarate | 35 |
| Benzoyl peroxide | 0.5 |

It is to be recognized that diethylene glycol fumarate in Examples I to VII may be replaced by diethylene glycol maleate or triethylene glycol fumarates and maleates and other esters, e. g., glycerides of αβ dicarboxylic acids and anhydrides thereof. It is contemplated that the reaction may be conducted in the presence or absence of solvents, such as ethyl acetate or other non-reactive organic solvents.

The reaction products are characterized by great hardness, toughness, clarity and surface brilliance. The dicarboxylic acid component, e. g., the maleic anhydride, apparently constitutes a true reaction component and cannot be extracted from the resin product by means of solvents, and it cannot be detected by taste unless it is used in excessive amounts. The solid resins can be sawed, drilled, planed and otherwise shaped or worked. Likewise they may be formed into sheets, tubes, rods and other bodies by heat and pressure molding. The process of the present invention lends itself particularly well to forming objects of various size and shape by casting. The resin components while still flowable or liquid need only to be introduced into any convenient mold of desired shape and then polymerized to solid state at a convenient temperature, e. g., 50 to 100° C. The high speed of polymerization is of particular advantage in this process, because it admits of a very high rate of production from a given amount of equipment. Hardened bodies can be obtained in periods varying from a few minutes to an hour or two, as may be desired.

The compositions are also suitable for use as coating agents:

Example VIII

A lacquer or varnish was prepared by admixture of 70 parts by weight of diethylene glycol fumarate, 35 parts by weight of styrene, 30 parts by weight of maleic anhydride, and 2 parts of benzoyl peroxide. The mixture was thinned with ethyl acetate to spraying consistency and was then applied as a spray to steel panels. These were baked for 30 minutes at 100° C. to produce films having great surface hardness and clarity. Of course the clear solutions could be colored or opacified with dyes and pigments, such as titanium dioxide or basic lead carbonate.

Solutions such as above described, with solvent or diluent in amount to give desired consistency, could also be admixed with carbon black, for example, in the amounts of 10 to 50 percent, based on solids content to provide compositions which could be used as printing inks useful in printing upon and coating paper and other materials. Printed sheets impressed with such inks could be dried quickly to a non-tacky state by passing them over heated drums or contiguous to a flame or to suitable radient heaters.

A further application of the resins would involve use as investment media for samples such as insects, biological specimens and other objects which it might be desirable to coat or embed in a transparent protective medium. The high speed of polymerization even at low temperatures renders the compositions especially useful in this art. The objects to be embedded can be introduced into fluid mixtures of components containing nitro methane, nitro ethane or the like plasticizer in an amount of 10% or more, based on solids content, before they have become too viscous; then by mildly heating the fluid medium for a very short period of time, i. e., an hour or two, the resin is transformed into its clear, hard and tough state. The resins shrink but little during polymerization and consequently distortions and checking and cracking are not likely to occur. The surfaces of the embedment medium are smooth and brilliant, even without polishing or machining. However, if desired, they may be given greater brilliance and freedom from ripples and irregularities by suitable polishing operations.

Plasticizers may be included in the resins of Examples I to VII in appropriate amounts, varying for example from 10 to 50 percent. A satisfactory proportion seems to be about 25 to 35 percent. These may be added to the reaction mixture at any stage prior to or during polymerization. The following constitute examples of plasticizers which are contemplated as being within the scope of the invention:

Diacetone alcohol
Acetophenone
Mesityl oxide
Levulinic acid esters, such as levulinic tetraacetate
Acetone
Dimethyl ketone
Methylethyl ketone
Isophorone
Camphor
Cyclohexanone
Ortho and para methyl cyclohexanone
Nitro methane
Nitro ethane
Nitro propane
Nitro butane
Dimethyl phthalate
Sorbitol hexaacetate and others Compositions including these components are characterized in many instances by exceptional brilliance and clarity.

The use of the resins especially when plasticized as interlayers in safety glass is contemplated. A convenient process of preparing such safety glass would involve application of the resinous mixtures or components of the resinous mixtures while in fluid state as coatings to the surfaces of the glass sheets, which are to be joined. By contacting the coated surfaces with each other under conditions to obviate the presence of air bubbles and then mildly heating the superposed plates or by subjecting the plates to irradiation a bond of hard and tough resins can be obtained.

The forms of the invention herein described are to be considered primarily as exemplary. It will be apparent to those skilled in the art that numerous modifications may be made therein without departure from the spirit of the invention or the scope of the appended claims.

What I claim is:

1. A process of preparing a tough, hard, resinous product, which comprises conjointly polymerizing a mixture of styrene, diethylene glycol fumarate and maleic anhydride.

2. A process of preparing a tough, hard, resinous product, which comprises subjecting to conjoint polymerization a mixture consisting substantially of styrene, in the ratio of 12 to 35 parts diethylene glycol fumarate in the ratio of 15 to 35 parts and maleic anhydride in the ratio of 10 to 25 parts, the parts in each instance being by weight.

3. A process of preparing a tough, hard, resinous product, which comprises subjecting to conjoint polymerization a mixture of approximately 31 parts of styrene, 35 parts of diethylene glycol fumarate and 25 parts of maleic anhydride, the parts in each instance being by weight.

4. A process of preparing a tough, hard, resinous product, which comprises subjecting to copolymerization a mixture of (A) polymerizable hydrocarbon consisting of a 2 phenyl substituted, monoolefin containing 2 to 3 carbon atoms in the olefin group, (B) an ester of an alcohol containing 2 to 3 hydroxy groups and an $\alpha\beta$-unsaturated $\alpha\beta$-dicarboxylic acid, (C) a material selected from a class consisting of $\alpha\beta$-unsaturated $\alpha\beta$-dicarboxylic acids and the anhydrides of $\alpha\beta$-unsaturated $\alpha\beta$-dicarboxylic acids.

5. A process of preparing a tough, hard, resinous product, which comprises subjecting to copolymerization a mixture of (A) a polymerizable hydrocarbon consisting of a 2 phenyl substituted monoolefin containing 2 to 3 carbon atoms in the olefin group, (B) an ester of a glycol and an $\alpha\beta$-unsaturated, $\alpha\beta$-dicarboxylic acid, (C) a material selected from a class consisting of $\alpha\beta$-unsaturated, $\alpha\beta$-dicarboxylic acids and the anhydrides of $\alpha\beta$-unsaturated $\alpha\beta$-dicarboxylic acids.

6. A process of preparing a tough, hard, resinous product, which comprises subjecting to copolymerization a mixture of (A) a polymerizable hydrocarbon consisting of 2 phenyl substituted monoolefin containing 2 to 3 carbon atoms in the olefin group, (B) an ester of a glycol and an $\alpha\beta$-unsaturated $\alpha\beta$-dicarboxylic acid and (C) maleic anhydride.

7. As a new product the hard, tough, resinous product comprising the copolymer of (A) polymerizable hydrocarbon consisting of a 2 phenyl substituted monoolefin containing 2 to 3 carbon atoms in the olefin group, (B) an ester of dihydric alcohol and an $\alpha\beta$-unsaturated $\alpha\beta$-dicarboxylic and (C) maleic anhydride.

8. A process of preparing a tough, hard, resinous product from (A) styrene and (B) an ester of an alcohol containing 2 to 3 hydroxy groups and fumaric acid, said process consisting in effecting conjoint polymerization of the styrene and the ester in the presence of maleic anhydride.

HOWARD L. GERHART.